United States Patent
Mally

(10) Patent No.: US 8,979,156 B2
(45) Date of Patent: Mar. 17, 2015

(54) VEHICLE PANEL ATTACHMENT ARRANGEMENT

(71) Applicant: Nissan North America, Inc., Franklin, TN (US)

(72) Inventor: Thomas Mally, Beverly Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 47 days.

(21) Appl. No.: 13/848,825

(22) Filed: Mar. 22, 2013

(65) Prior Publication Data

US 2014/0284962 A1    Sep. 25, 2014

(51) Int. Cl.
*B60R 13/02* (2006.01)
*F16B 21/00* (2006.01)

(52) U.S. Cl.
CPC ............ *F16B 21/00* (2013.01); *B60R 13/0206* (2013.01); *B60R 13/0243* (2013.01)
USPC .............. 296/1.08; 296/29; 24/297; 15/716.7

(58) Field of Classification Search
CPC ......... B62D 27/04; B62D 27/06; B60J 5/048; B60J 5/0469; B60J 10/0085; B60R 13/0206
USPC .......... 296/191, 29, 1.08, 146.7; 24/292, 297; 52/716.7, 716.5
See application file for complete search history.

(56) References Cited

U.S. PATENT DOCUMENTS

| | | | |
|---|---|---|---|
| 3,771,275 A | 11/1973 | Seckerson | |
| 5,507,610 A | 4/1996 | Benedetti et al. | |
| 5,651,634 A | 7/1997 | Kraus | |
| 5,865,500 A | 2/1999 | Sanada et al. | |
| 6,594,870 B1 | 7/2003 | Lambrecht et al. | |
| 6,715,185 B2 | 4/2004 | Angellotti | |
| 7,152,281 B2 | 12/2006 | Scroggie | |
| 7,178,855 B2 | 2/2007 | Catron et al. | |
| 7,188,815 B2 * | 3/2007 | Peterson | 248/316.7 |
| 7,272,873 B2 | 9/2007 | Nessel et al. | |
| 7,954,205 B2 | 6/2011 | Xueyong et al. | |
| 8,291,553 B2 | 10/2012 | Moberg | |
| 2004/0083583 A1 | 5/2004 | Bradley et al. | |
| 2006/0197356 A1* | 9/2006 | Catron et al. | 296/146.7 |
| 2007/0107174 A1 | 5/2007 | Bordas | |
| 2009/0218464 A1 | 9/2009 | Kato et al. | |
| 2011/0035909 A1* | 2/2011 | Moberg | 24/289 |
| 2011/0119875 A1* | 5/2011 | Iwasaki | 24/458 |
| 2013/0181475 A1* | 7/2013 | Torii | 296/146.7 |
| 2013/0255065 A1* | 10/2013 | Bachelder et al. | 29/525.01 |
| 2013/0305653 A1* | 11/2013 | Ishizu et al. | 52/718.01 |
| 2014/0137374 A1* | 5/2014 | Iwasaki | 24/292 |
| 2014/0191526 A1* | 7/2014 | Lauxen et al. | 296/1.08 |

* cited by examiner

*Primary Examiner* — Jason S Morrow
(74) *Attorney, Agent, or Firm* — Global IP Counselors, LLP

(57) ABSTRACT

A vehicle panel attachment arrangement includes a vehicle panel, a clip supporting section, a first wall section, a second wall section and at least one resilient arm. The clip supporting section defines a shaft receiving hole extending therethrough. The first and second wall sections extend from the vehicle panel to first and second sides of the clip supporting section. The clip supporting section further defines a shaft insertion slot open to the shaft receiving hole. The shaft insertion slot extends in a radial direction from the shaft receiving hole between the first and second side walls. The at least one resilient arm extends from one of the clip supporting section and the first wall section in a direction perpendicular to the radial direction. A portion of the at least one resilient arm is aligned with the clip supporting section and another portion of the at least one resilient arm is offset from the clip supporting section as viewed in the radial direction.

20 Claims, 9 Drawing Sheets

VEHICLE PANEL ATTACHMENT ARRANGEMENT

BACKGROUND

1. Field of the Invention

The present invention generally relates to a vehicle panel attachment arrangement. More specifically, the present invention relates to a vehicle panel or trim panel that includes a clip supporting section that securely retains an attachment clip installed to the clip supporting section.

2. Background Information

A vehicle panel includes a plurality of openings that are shaped to receive an attachment fastener or clip. The clip is a snap fitting fastener having a first portion that is inserted into the opening of the vehicle panel. Thereafter, a second portion of the clip is snap fitted to an aperture in a door fixing the door panel to the door.

SUMMARY

One object of the current disclosure is to provide a panel with a clip supporting section that securely retains an attachment clip installed to the clip supporting section.

Another object of the current disclosure is to provide a panel with a clip supporting section that provides easy installation of an attachment clip and retains the attachment clip to the panel after installation.

In view of the state of the known technology, one aspect of the present disclosure is to provide vehicle panel with a retaining structure that includes a clip supporting section, a first wall section, a second wall section and at least one resilient arm. The clip supporting section is spaced apart from the vehicle panel and defines a shaft receiving hole extending therethrough. The first wall section extends from the vehicle panel to a first side of the clip supporting section. The second wall section extends from the vehicle panel to a second side of the clip supporting section. The clip supporting section further defines a shaft insertion slot open to the shaft receiving hole. The shaft insertion slot extends in a radial direction from the shaft receiving hole between the first and second side walls. The at least one resilient arm extends from one of the clip supporting section and the first wall section in a direction perpendicular to the radial direction. A portion of the at least one resilient arm is aligned with the clip supporting section and another portion of the at least one resilient arm is offset from the clip supporting section as viewed in the radial direction.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
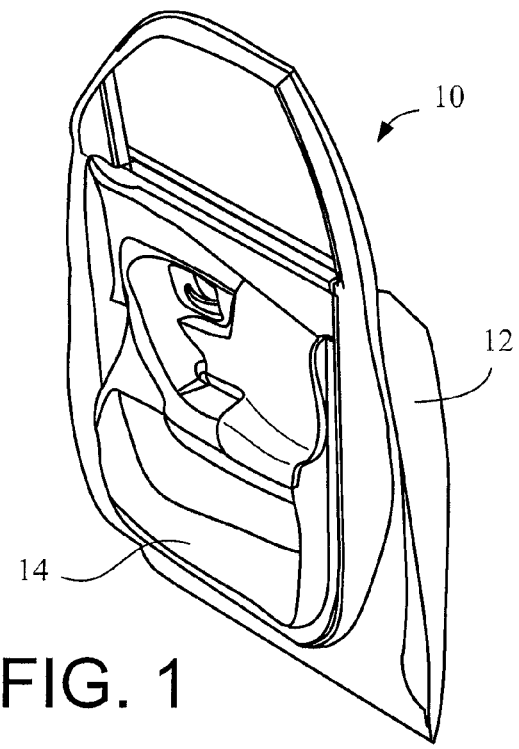
FIG. 1 is a perspective view of a vehicle door in accordance with the various embodiments.
Figure 2:
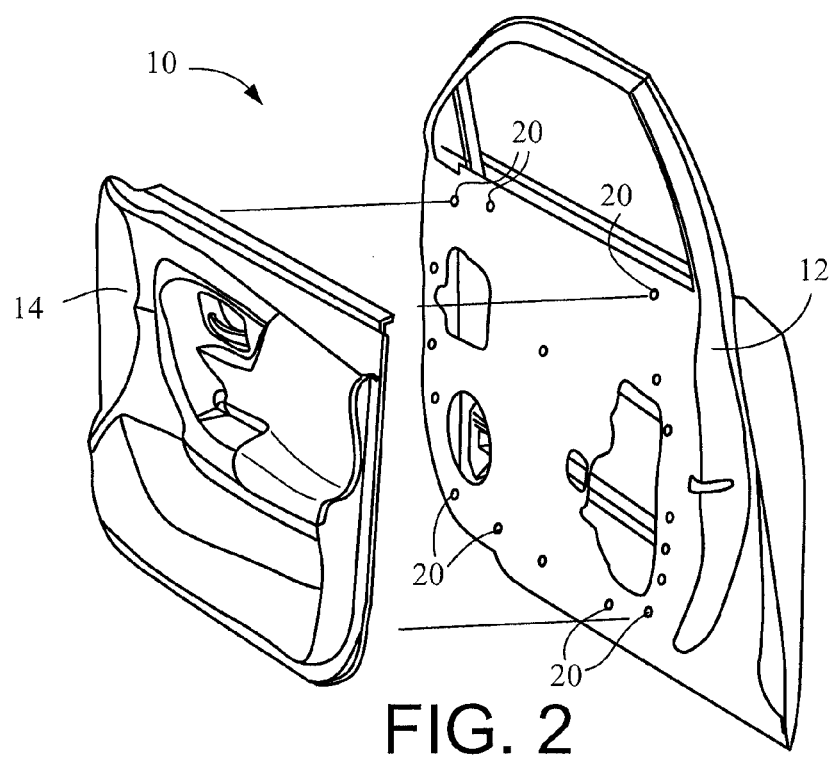
FIG. 2 is an exploded perspective view of the vehicle door showing a main body of the door and a trim panel aligned with the main body ready for installation in accordance with the various embodiments.
Figure 3:
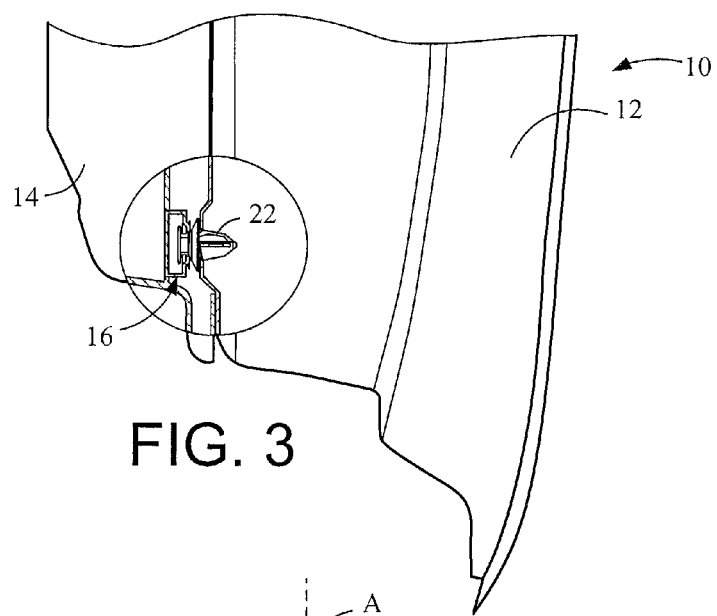
FIG. 3 is an end elevational view of a portion of the vehicle door with portions of a panel attachment arrangement in cross-section showing a clip installed to the panel attachment arrangement and snap-fitted to the main body of the vehicle door in accordance with a first embodiment.

Referring initially to FIG. 1, a vehicle door 10 is illustrated in accordance with a first embodiment. As shown in FIG. 2, the vehicle door 10 includes a main body 12 and a vehicle panel or trim panel 14. As shown in FIG. 3, the trim panel 14 is provided with a panel attachment arrangement 16 that is described in greater detail below.

In the depicted embodiments, the trim panel 14 is a decorative and functional panel that attaches to the main body 12 of the vehicle door 10. However, it should be understood from the drawings and the description hereinbelow, that the trim panel 14 and the panel attachment arrangement 16 can be used at any of a variety of locations within an interior a vehicle (not shown) or can be used at an exterior of the vehicle (not shown). For example, a trim panel for a side wall of a van, a trim panel for an instrument board or a trim panel for a center console of vehicle can be provided with the panel attachment arrangement 16 such that the trim panel can be installed to the side wall, instrument or the center console of a vehicle in a manner consistent with the descriptions below. Similarly, exterior vehicle trim elements or panels can likewise be provided with the panel attachment arrangement 16 such that the exterior element or exterior panel can be installed to an outer surface of the vehicle.

As shown in FIG. 2, an interior surface of the main body 12 of the vehicle door 10 is provided with a plurality of apertures 20. These apertures 20 are arranged and positioned such that clips 22 (FIG. 3) are inserted into respective ones of the apertures 20, and snap-fitted thereto. The clips 22 being snap-fitted into the apertures 20 securely adhere to the main body 12. The trim panel 14 includes a plurality of clip supporting sections 24 (FIG. 4) that is positioned on the trim panel 14 such that each of the lip supporting sections 24 approximately aligns with a respective one of the apertures 20. The clips 22 are installed to the clip supporting sections 24.

As depicted in FIG. 2, the trim panel 14 is brought into position with the main body 12 of the vehicle door 12 such that the clips 22 approximately align with the apertures 20. Thereafter, the clips 22 can be pushed into respective ones of the apertures 20 and the trim panel 14 is securely attached to the vehicle door 10.

A problem with conventional trim panels is that the clips 22 are installed to openings in the conventional trim panels, but often fall off the conventional trim panels during shipping and handling, and/or during installation to vehicles. Consequently, one or more of the clips may be missing when it comes time to install the conventional trim panels. The panel attachment arrangement 16 described hereinbelow provides a solution to this situation by ensuring that the clips 22 remain installed on the trim panel 14.

Figure 4:
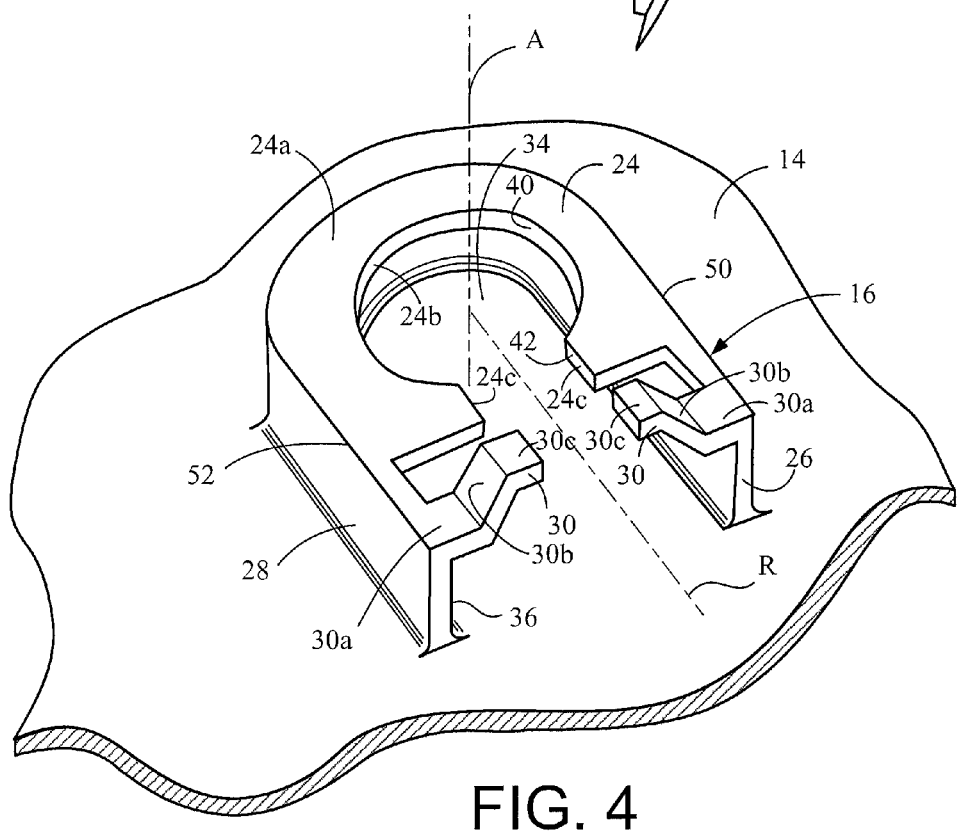
FIG. 4 is a perspective view of a portion of the trim panel showing the panel attachment arrangement including a clip supporting section and retaining arms in accordance with the first embodiment.

FIG. 4 is an enlarged perspective view of a portion of the panel attachment arrangement 16. The depicted portion of the panel attachment arrangement 16 includes the clip supporting section 24, a first wall section 26, a second wall section 28 and retaining arms 30.

In the first embodiment of the panel attachment arrangement 16, the clip supporting section 24 is spaced apart from the trim panel 14. As shown in FIG. 4, the clip supporting section 24, the first wall section 26 and the second wall section 28 define a partially closed structure, like a doghouse, with a floor 34 beneath the clip supporting section 24. The floor 34, the first wall section 26, the second wall section 28 and the arms 30 define an opening 36 at one side of the overall structure of the panel attachment arrangement 16. The opening 36 is provided for installation of the clip 22 to the panel attachment arrangement 16, as described in greater detail below.

The clip supporting section 24 is spaced apart from the trim panel 14 and the floor 34. The clip supporting section 24 has a planar top surface 24a (relative to the depiction in FIG. 4) that defines a shaft receiving hole 40 that extends completely through the clip supporting section 24. The clip supporting section 24 includes an arcuate surface 24b that defines the shaft receiving hole 40. In the depicted embodiment, the top surface 24a is parallel to adjacent surfaces of the trim panel 14 and the floor 34. However, it should be understood from the drawings and the description herein that the top surface 24a can be angled or otherwise offset from the adjacent surfaces of the trim panel 14. For example, the trim panel 14 includes a plurality of curved and contoured surface sections, as indicated in FIGS. 1 and 2. The clip supporting section 24 is oriented such that a subsequently installed clip 22 can be snap-fitted to the main body 12 of the door. Therefore at many locations along the trim panel 14, the clip supporting section 24 must be angularly offset from adjacent surfaces of the trim panel 14 and is not parallel thereto.

It is therefore not required for the top surface 24a of each of the panel attachment arrangements 16 to be parallel to adjacent surface sections of the trim panel 14. Further, in the depicted embodiments, the top surface 24a is a planar surface. However, it is possible to provide the top surface 24a with a contoured, curved or non-planar shape. However, using the clips 22 (described in greater detail below), it is desirable for at least a majority of the top surface 24a to be generally or approximately planar.

The top surface 24a of the clip supporting section 24 also defines a shaft insertion slot 42. The clip supporting section 24 includes surfaces 24c that are parallel to one another and define the shaft insertion slot 42 therebetween. The surfaces 24c extend from ends of the arcuate surface 24b.

As indicated in FIG. 4, the shaft receiving hole 40 has a central axis A. The shaft insertion slot 42 extends radially outward from the shaft receiving hole 40 and the central axis A. More specifically, a center of the shaft insertion slot 42 is aligned with a radially extending line representing a radial direction R, as shown in FIG. 4. Further, the shaft insertion slot 42 is open to the shaft receiving hole 40 and is located between the first and second wall sections 26 and 28.

The first wall section 26 extends from an adjacent section of the trim panel 14 to a first side 50 of the clip supporting section 24. The second wall section 28 extends from the adjacent section of the vehicle panel 14 to a second side 52 of the clip supporting section 24. The first and second wall sections 26 and 28 are depicted as being generally perpendicular to the top surface 24a if the clip supporting section 24. However, it should be understood from the drawings and the description herein that the first and second wall sections 26 and 28 can have any of a variety of shapes and sloped angles relative to the top surface 24a. Further, edges of the top surface 24a at the first and second sides 50 and 52 are shown as defining right angles. It should be understood from the drawings and the description herein that a curved transition can also be provided at the first and second sides 50 and 52 of the top surface 24a such that the first and second wall sections 26 and 28 have curved contours extending in directions away from the top surface 24a.

Figure 5:
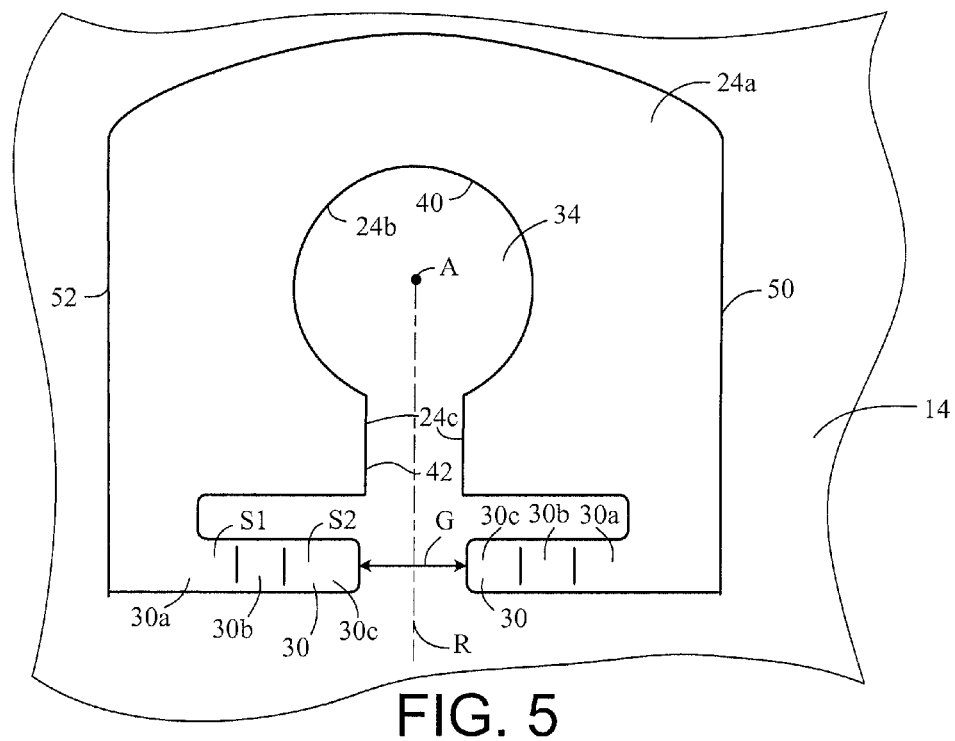
FIG. 5 is a plan view of the panel attachment arrangement showing features of the clip supporting section and the retaining arms in accordance with the first embodiment.

As shown in FIGS. 4 and 5, at a first side, the arms 30 extend from an area of the clip supporting section 24 spaced apart from the shaft receiving hole 40 and the shaft insertion slot 42. Further, in the area around the opening 36, the arms 30 extend toward one another from respective ones of the first and second wall sections 26 and 28 in a direction perpendicular to the radial direction R. The arms 30 (and hence the trim panel 14) are made of a material that is resilient and flexible in a manner described in greater detail below.

Figure 6:
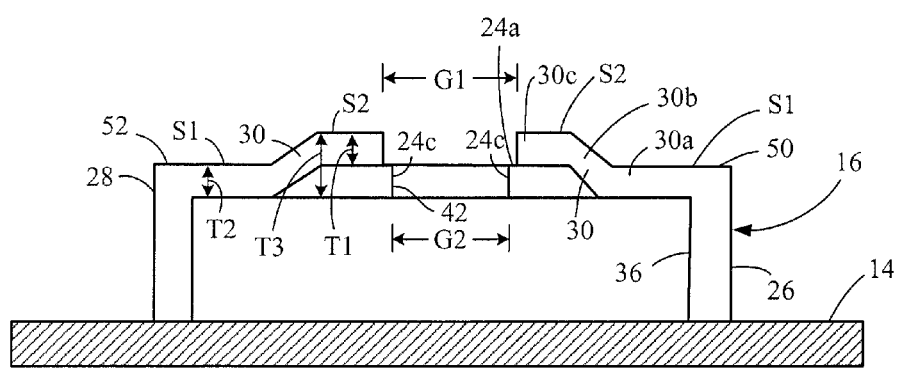
FIG. 6 is an end view of the panel attachment arrangement showing features of the clip supporting section and the retaining arms in accordance with the first embodiment.

Each of the arms 30 includes a base portion 30a, a mid-portion 30b and a distal end portion 30c. The base portion 30a has a main surface $S_1$ that is co-planar with the top surface 24a (planar surface) of the clip supporting section 24. The distal end portion 30c has a main surface $S_2$ that is offset from and parallel to the top surface 24a (planar surface) of the clip supporting section 24 with the arms 30 in an at rest position as shown in FIG. 6. Further, FIG. 6 corresponds to a view in the radial direction R and shows that the base portion 40a of the arm 30 aligns with the clip supporting section 24, while the distal end portion 30c is offset from the clip supporting section as viewed in the radial direction. The base portion 30a and the distal end portion 30c have the same thickness or uniform thickness $T_1$ as measured in a direction of the thickness of the clip supporting section $T_2$. In the depicted embodiment, the thickness $T_1$ is equal to the thickness $T_2$. However, it should be understood from the drawings and the description herein that the thickness $T_1$ can be greater than the thickness $T_2$, or the thickness $T_1$ can be less than the thickness $T_2$, depending upon the overall design of the trim panel 14 and the panel attachment arrangement 16.

The mid-portion 30b extends from the base portion 30a to the distal end portion 30c and, as shown in FIGS. 4 and 6, the mid-portion 30b is angularly offset from both the base portion 30a and the distal end portion 30c. The mid-portion 30b is preferably provided with the thickness $T_1$ but can be provided with a reduced thickness or a greater thickness. As shown in FIG. 6, the arms 30 extend from opposite ones of the first and second wall sections 26 and 28, and further extend toward one another. As well, the arms 30 are configured to block movement of the clip 22 in and out of the shaft receiving hole 40 and the shaft insertion slot 42, in a manner described in greater detail below. Consequently, the arms 30 block access to an open end of the shaft insertion slot 42 in a manner also described in greater detail below.

As shown in FIG. 6, an upper surface of the distal end portion 30c and a lower surface of the base portion 30a, define a distance $T_3$.

As is indicated in FIGS. 4, 5 and 6, the arms 30 extend toward one another, are symmetrical to one another relative to the radial direction R, and are aligned with one another. Between the facing end surfaces of the distal end portion 30c of each of the arms 30, a gap $G_1$ is defined. Between the surfaces 24c of the shaft insertion slot 42 a width or gap $G_2$ is defined. As shown in FIGS. 5 and 6, the gap $G_1$ is slightly larger than the gap $G_2$.

Figure 7:
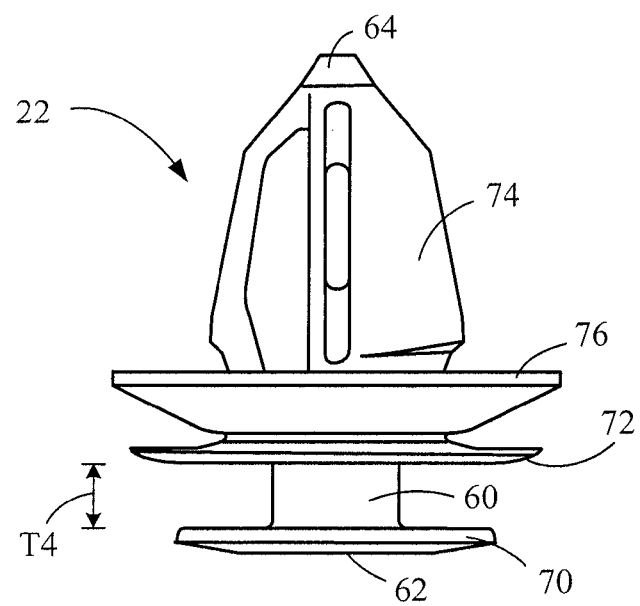
FIG. 7 is side view of the clip in accordance with the various embodiments.
Figure 8:
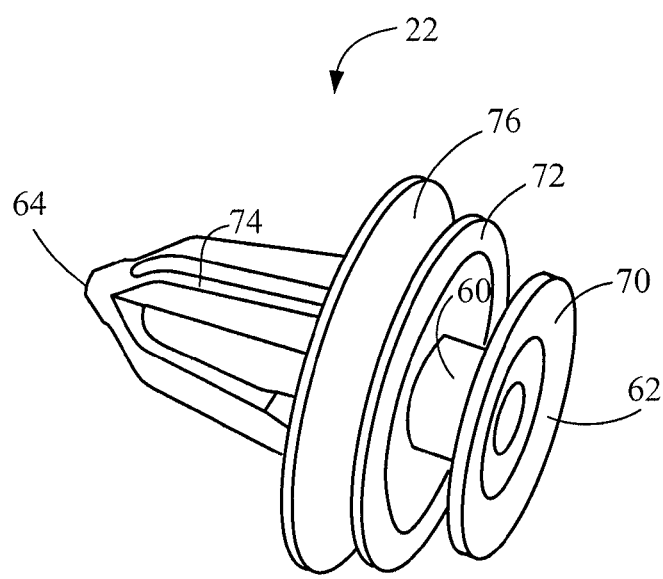
FIG. 8 is a perspective view of the clip in accordance with the various embodiments.

A description of the clip 22 is now provided with specific reference to FIGS. 7 and 8. The clip 22 is preferably made of a plastic or polymer material that exhibits resiliency. The clip 22 is basically a fastener that has a cylindrically shaped shaft 60, a first end 62 and a second end 64. The first end 62 includes a first retaining section 70 and a second retaining section 72 spaced apart from the first retaining section 70 exposing a portion of the shaft 60. The first and second retaining sections 70 and 72 each have an annular, washer or disc-like shape centered relative to the shaft 60. The second end 64 of the clip 22 includes a snap-fitting projection 74 and a cup shaped section 76. The snap-fitting projection 74 is a conventional structure that elastically deforms when forced into one of the apertures 20 of the door 10. Specifically, the overall outer dimension of the snap-fitting projection 74 is larger than the diameter of the aperture 20 of the door 10. The cup shaped section 76 cooperates with the snap-fitting projection 74 in that it presses against one surface of the main body 12 of the door 10 while the snap-fitting projection 74 engages an opposite surface of the main body 12 of the door 10 in the area around the aperture 20, thereby non-movably retaining the clip to the main body 12 of the door 10. Since the snap-fitting projection 74 and the cup shaped section 76 of the clip 22 are conventional features, further description is omitted for the sake of brevity.

The first retaining section 70 and the second retaining section 72 (a first washer portion and a second washer portion) are spaced apart from one another by a distance $T_4$, as indicated in FIG. 7. The distance $T_4$ is less than the distance $T_3$, the distance $T_3$ being defined between the upper surface of the distal end portion 30c and the lower surface of the base portion 30a (shown in FIG. 6).

A description of the installation process of the clip 22 to the panel attachment arrangement 16 is now provided with specific reference to FIGS. 9 thru 13.

Figure 9:
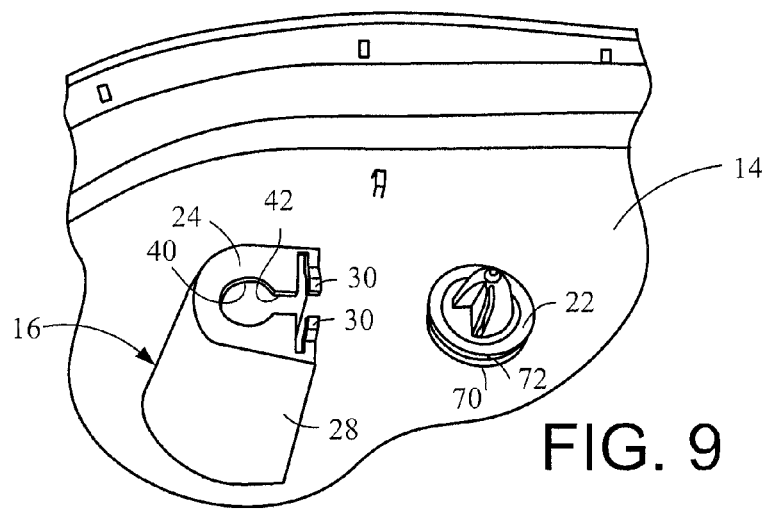
FIG. 9 is a perspective view of the trim panel and one of the panel attachment arrangements with the clip about to be installed to the panel attachment arrangement in accordance with the first embodiment.
Figure 10:
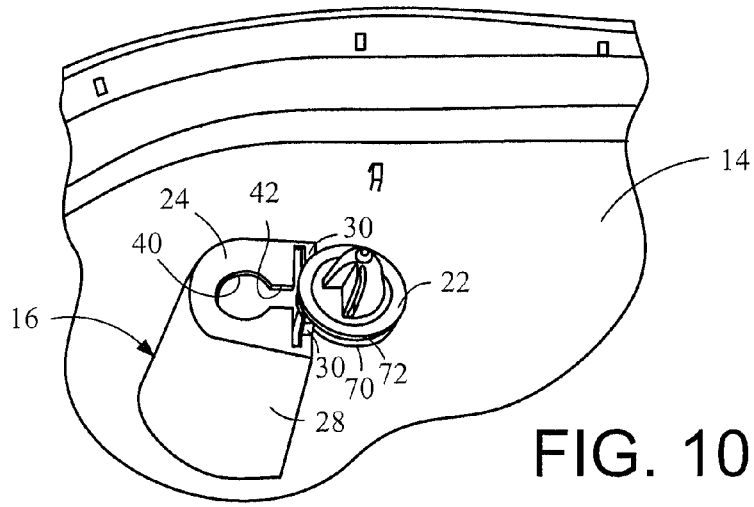
FIG. 10 is another perspective view of the trim panel and one of the panel attachment arrangements similar to FIG. 9 showing the clip being installed to the panel attachment arrangement in accordance with the first embodiment.
Figure 11:
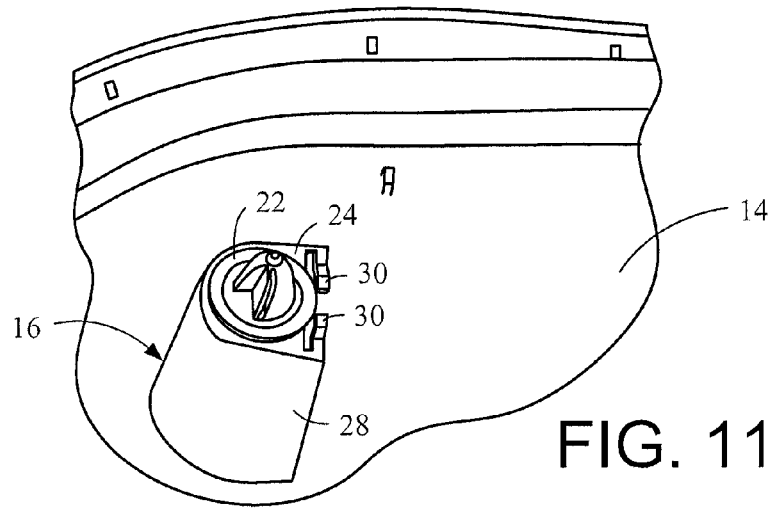
FIG. 11 is yet another perspective view of the trim panel and one of the panel attachment arrangements similar to FIGS. 9 and 10 showing the clip fully installed to the panel attachment arrangement and retained by the retaining arms in accordance with the first embodiment.
Figure 12:
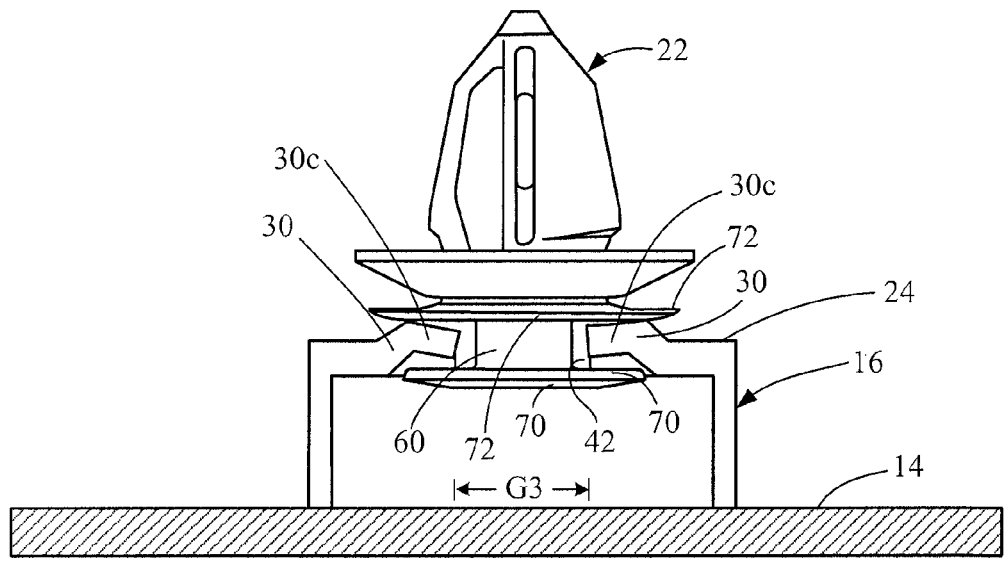
FIG. 12 is an end view of the trim panel and one of the panel attachment arrangements corresponding to FIG. 10 showing the clip being installed to the panel attachment arrangement with the retaining arms being elastically deformed in accordance with the first embodiment.
Figure 13:
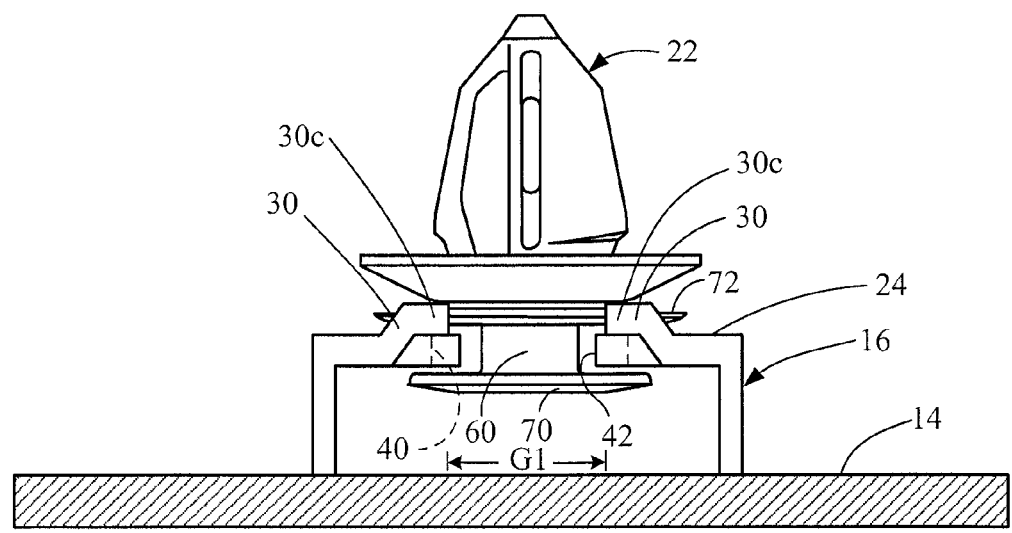
FIG. 13 is another end view of the trim panel and one of the panel attachment arrangements similar to FIG. 12 showing the clip fully installed to the panel attachment arrangement and retained by the retaining arms in accordance with the first embodiment.

In FIG. 9, the clip 22 is brought toward the panel attachment arrangement 16. In FIG. 9, the panel attachment arrangement 16 has elongated side wall section 28. During installation of the clip 22 to the panel attachment arrangement 16, the arms 30 are inserted between the first and second retaining sections 70 and 72, as indicated in FIGS. 10 and 12. Since the first retaining section 70 and the second retaining section 72 are separated from one another by the distance $T_4$, which is smaller than the distance $T_3$ between the upper surface of the distal end portion 30c and the lower surface of the base portion 30a (shown in FIG. 6), the arms 30 must elastically deform or deflect as the clip 22 is being gently forced into the shaft insertion slot 42, as shown in FIG. 12. As shown in FIGS. 11 and 13, the clip 22 is eventually pushed past the arms 30, and the clip 22 is properly installed to the panel attachment arrangement 16.

In the installed position, as shown in FIGS. 11 and 13, the shaft 60 of the clip 22 is located within the shaft receiving hole 40. The shaft receiving hole 40 has an overall diameter greater than the shaft 60 of the clip 22. Therefore, the clip 22 can be moved relative to the shaft receiving hole 40 and remain in the installed position. Movement of the clip 22 within the shaft receiving hole 40 is useful in that the apertures 20 of the main body 12 of the door 10 have large tolerances. The position of the clip 22 can thus be adjusted during installation of the trim panel 14 to the vehicle door 10 in order to make up for any minor mis-alignments between the apertures 20 and the panel attachment arrangement 16.

Further, in the installed position shown in FIGS. 11 and 13, the arms 30 are no longer flexed and have returned to the at rest positions, similar to the positions of the arms 30 shown in FIGS. 6 and 9. In the at rest position, the arms 30 align with the second retaining section 72, effectively preventing the clip 22 from moving out of the panel attachment arrangement 16.

Hence, the clip 22 is movable from an insertion position (FIGS. 10 and 12) to an installed position (FIGS. 11 and 13) such that in the insertion position the shaft 60 of the clip 22 can be located within the shaft insertion slot 42 with the arm 30 being elastically deformed between the first and second retaining sections 70 and 72 (the first and second washer portions. Further, in the installed position (FIGS. 11 and 13) the shaft 60 of the clip 22 is located within the shaft receiving hole 40 and the arms 30 are in a restricting orientation, restricting movement of the clip 22 from the installed position.

As shown in FIG. 13 the gap $G_1$ is clearly shown between the respective distal end portions 30c of the arms 30 with the clip 22 in the installed position. However, as shown in FIG. 12, a gap $G_3$ smaller than the gap $G_1$ is defined between the respective distal ends 30c of the arms 30 with the clip 22 installation position. The reduction of the gap $G_1$ to the smaller gap $G_3$ is due to the deflection of the arms 30 during installation of the clip 22.

Second Embodiment

Figure 14:
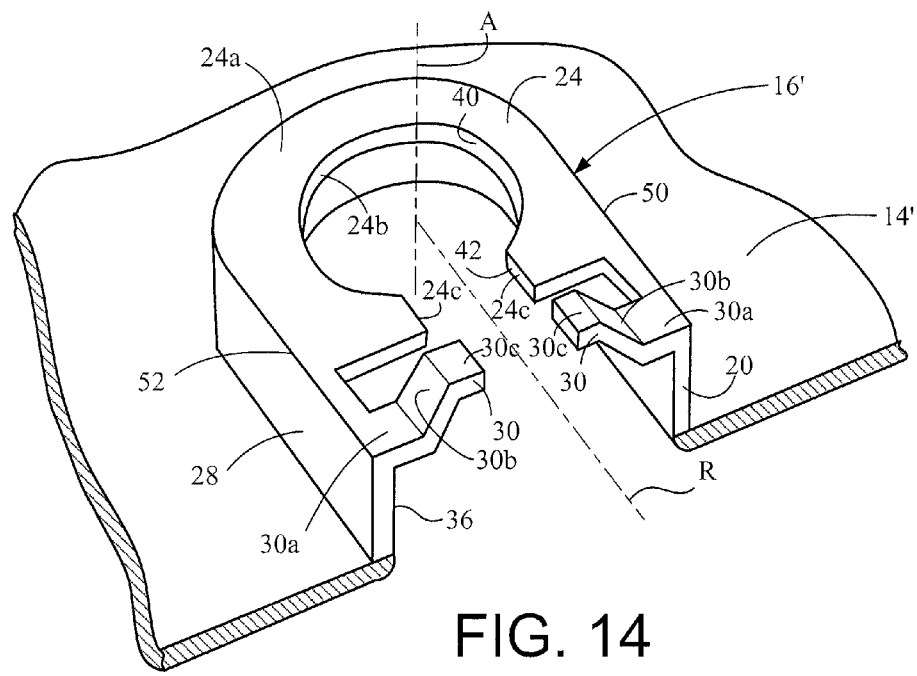
FIG. 14 is a perspective view of a portion of a trim panel showing a panel attachment arrangement including a clip supporting section and retaining arms in accordance with a second embodiment.
Figure 15:
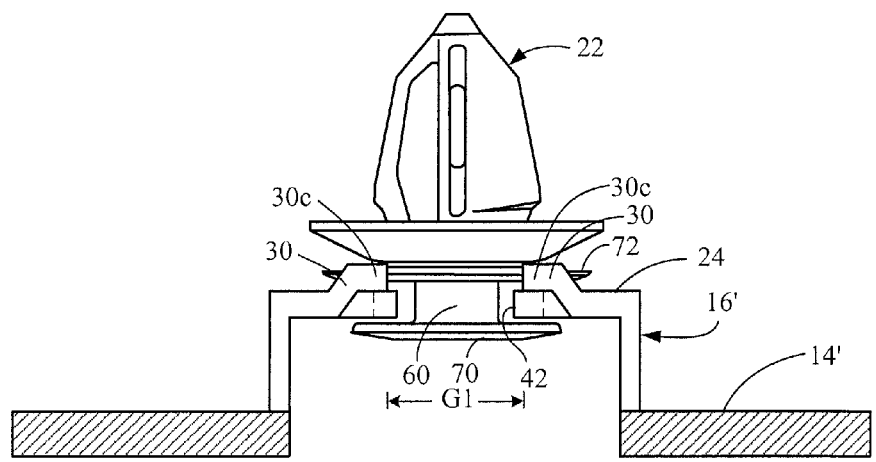
FIG. 15 is an end view of the trim panel and one of the panel attachment arrangements showing the clip fully installed to the panel attachment arrangement and retained by the retaining arms in accordance with the second embodiment.

Referring now to FIGS. 14 and 15, a trim panel 14' and a panel attachment arrangement 16' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment the trim panel 14' and the panel attachment arrangement 16' include all of the features of the trim panel 14 and the panel attachment arrangement 16 of the first embodiment, except that in the second embodiment, there is no floor 34. In other words, the bottom of the panel attachment arrangement 16' in the second embodiment includes an opening. Such a modification can be useful in the manufacturing and molding processes often used to manufacture the trim panel 14 and trim panel 14'. Otherwise, the trim panel 14' and the trim panel 14, and the panel attachment arrangement 16' and the panel attachment arrangement 16 are identical.

Third Embodiment

Figure 16:
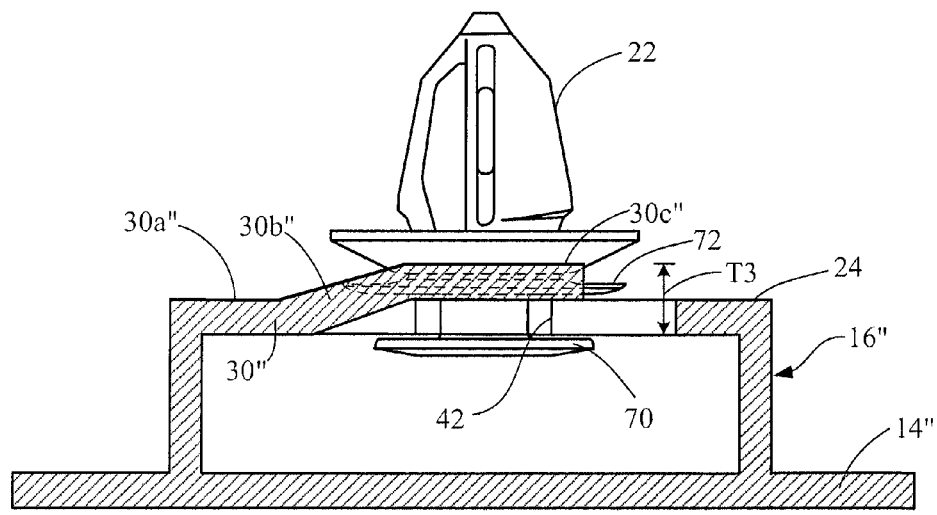
FIG. 16 is an end view of a trim panel and a panel attachment arrangement showing a single retaining arm in accordance with a third embodiment.
Figure 17:
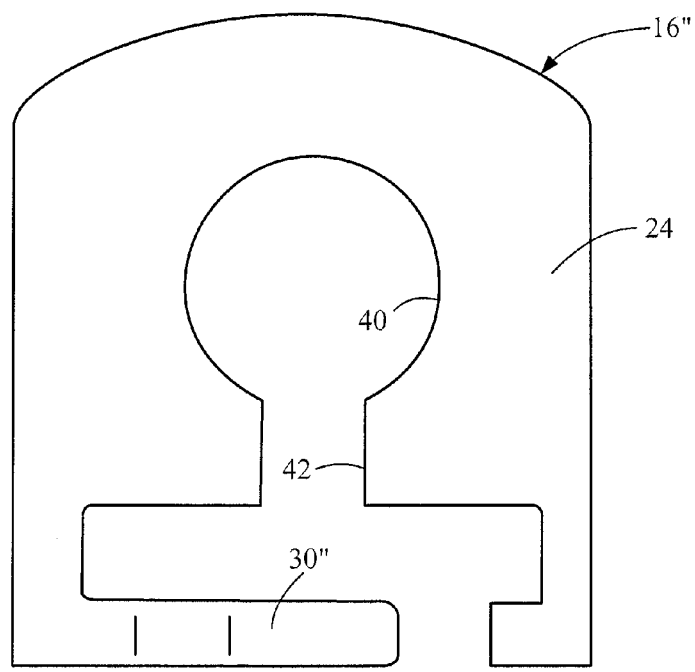
FIG. 17 is a plan view of the panel attachment arrangement showing features of the clip supporting section and the retaining arm in accordance with the third embodiment.

Referring now to FIGS. 16 and 17, a trim panel 14" and a panel attachment arrangement 16" in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a double prime (").

In the third embodiment, the trim panel 14" and the panel attachment arrangement 16" are identical to the trim panel 14 and the panel attachment arrangement 16, except that the pair of arms 30 has been eliminated and replaced with a single arm 30". The single arm 30" includes a base portion 30a", a mid-portion 30b" and a distal end portion 30c". As with the first embodiment, the base portion 30a" and the distal end portion 30c" have the same thickness or uniform thickness $T_1$. Further, an upper surface of the distal end portion 30c" and a lower surface of the base portion 30a", define a distance $T_3$, as described with respect to the first embodiment. The single arm 30" deflects in a manner similar to the arms 30 of the first embodiment. However, in the third embodiment, when the clip 22 is in the insertion position, the arm 30" and an adjacent portion of the first wall section 26 (similar to the base portion 30a") are elastically deformed between the first and second retaining sections 70 and 72. Alternatively, the arm 30" can be deflected completely below the clip 22 as the clip 22 is installed. However, once the clip 22 is installed, the arm 30" is aligned with the second retaining section 72, as indicated in phantom in FIG. 16, thereby retaining the clip 22 to the panel attachment arrangement 16".

Fourth Embodiment

Figure 18:
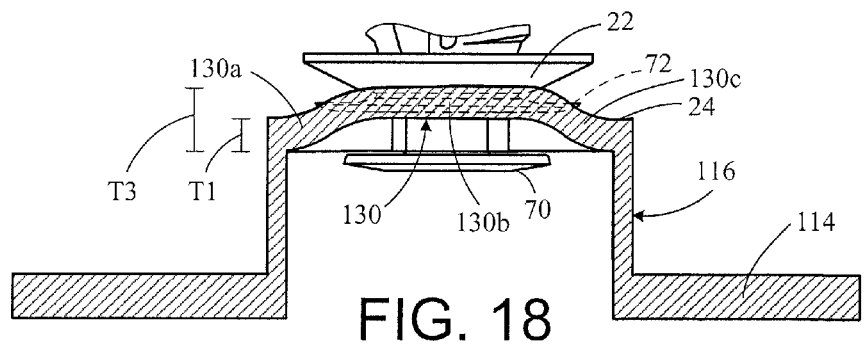
FIG. 18 is an end view of a trim panel and a panel attachment arrangement showing a single retaining arm in accordance with a fourth embodiment.
Figure 19:
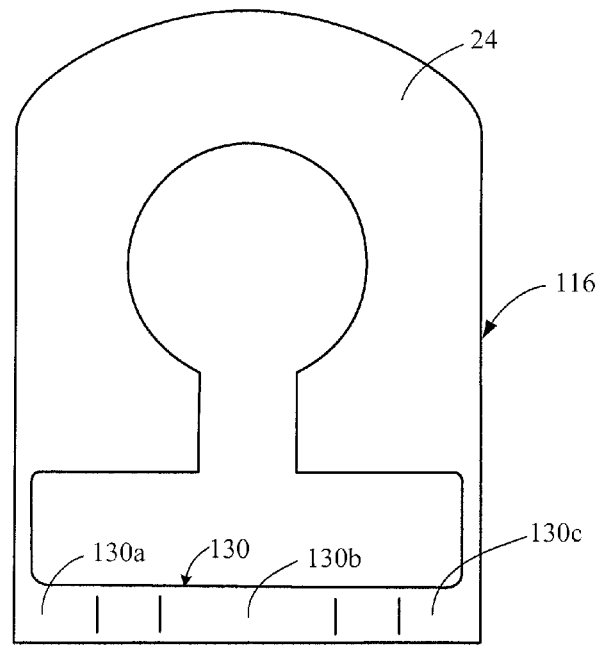
FIG. 19 is a plan view of the panel attachment arrangement showing features of the clip supporting section and the retaining arm in accordance with the fourth embodiment.

Referring now to FIGS. 18 and 19, a trim panel 114 and a panel attachment arrangement 116 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the trim panel 114 and the panel attachment arrangement 116 are identical to the trim panel 14 and the panel attachment arrangement 16, except that the pair of arms 30 has been eliminated and replaced with a single arm 130. The single arm 130 includes a first base portion 130a, a mid-portion 130b and a second base portion 130c. As with the first embodiment, the first and second base portions 130a and 130c, and the mid-portion 130b all have the same thickness or uniform thickness $T_1$. However, an upper surface of the mid-portion 130b and a lower surface of the first and second base portions 130a and 130c, define the distance $T_3$, as described with respect to the first embodiment. The single arm 130 deflects in a manner similar to the arms 30 of the first embodiment. However, in the fourth embodiment, when the clip 22 is installed, the arm 130 is deflected completely below the clip 22 as the clip 22 is installed. However, once the clip 22 is installed, the arm 130 is aligned with the second retaining section 72, as indicated in phantom in FIG. 18, thereby retaining the clip 22 to the panel attachment arrangement 116.

Fifth Embodiment

Figure 20:
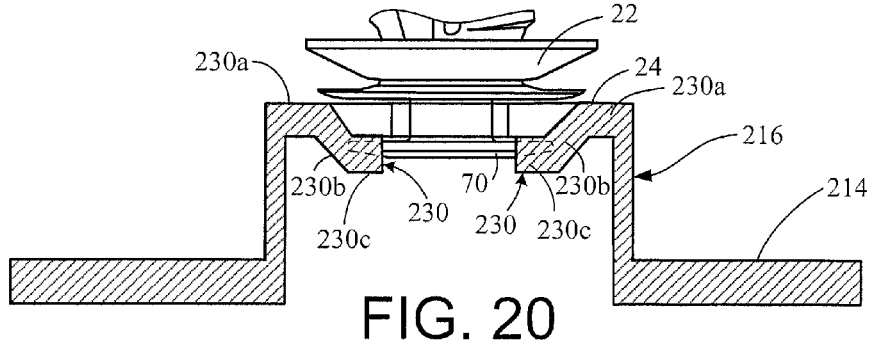
FIG. 20 is an end view of a trim panel and a panel attachment arrangement showing a pair of retaining arms in accordance with a fifth embodiment.

Referring now to FIG. 20, a trim panel 214 and a panel attachment arrangement 216 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the trim panel 214 and the panel attachment arrangement 216 are identical to the trim panel 14 and the panel attachment arrangement 16, except that the pair of arms 30 has been replaced with arms 230, which have been modified such that they extend downward relative to the depiction in FIG. 20, rather than upward in the depiction in FIG. 13. The arms 230 include base portions 230a, mid-portions 230b and distal end portions 230c. The arms 230 deflect in a manner similar to the arms 30 of the first embodiment, except in an upward direction so as to pass between the first and second retaining sections 70 and 72 as the clip 22 is installed to the panel attachment arrangement 216. However, once the clip 22 is installed, the arms 230 are aligned with the first retaining section 70, as indicated in phantom in FIG. 20, thereby retaining the clip 22 to the panel attachment arrangement 216.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion,"

"member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle panel attachment arrangement. Accordingly, these terms, as utilized to describe the present invention should be interpreted relative to a vehicle equipped with the vehicle panel attachment arrangement.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle panel attachment arrangement comprising
   a vehicle panel;
   a clip supporting section spaced apart from the vehicle panel and defining a shaft receiving hole extending therethrough;
   a first wall section extending from the vehicle panel to a first side of the clip supporting section;
   a second wall section extending from the vehicle panel to a second side of the clip supporting section, with the clip supporting section further defining a shaft insertion slot open to the shaft receiving hole and extending in a radial direction from the shaft receiving hole between the first and second side walls; and
   at least one resilient arm that extends in a lengthwise direction from one of the clip supporting section and the first wall section, the lengthwise direction of the at least one resilient arm being a direction perpendicular to the radial direction, with a portion of the at least one resilient arm extending being aligned with the clip supporting section and a portion of the at least one resilient arm being offset from the clip supporting section as viewed in the radial direction.

2. The vehicle panel attachment arrangement according to claim 1, wherein
   the at least one resilient arm comprises a pair of resilient arms.

3. The vehicle panel attachment arrangement according to claim 2, wherein
   a first of the pair of resilient arms extends from the first side of the clip supporting section and a second of the pair of resilient arms extends from the second side of the clip supporting section.

4. The vehicle panel attachment arrangement according to claim 3, wherein
   the first and second of the pair of resilient arms extend toward one another and are aligned with one another.

5. The vehicle panel attachment arrangement according to claim 1, wherein
   the resilient arm at least partially blocks an open end of the shaft insertion slot.

6. The vehicle panel attachment arrangement according to claim 5, wherein
   the at least one resilient arm extends from the first wall section to the second wall section.

7. A vehicle panel attachment arrangement comprising
   a vehicle panel;
   a clip supporting section having a planar surface that defines a shaft receiving hole extending therethrough;
   a first wall section extending from the vehicle panel to a first side of the clip supporting section;
   a second wall section extending from the vehicle panel to a second side of the clip supporting section, with the clip supporting section further defining a shaft insertion slot open to the shaft receiving hole and extending in a radial direction from the shaft receiving hole between the first and second side walls; and
   at least one resilient arm extending from one of the clip supporting section and the first wall section, the resilient arm having a base portion and a distal end portion, the base portion having a main surface that is co-planar with the planar surface of the clip supporting section, the distal end portion having a main surface that is offset from and parallel to the planar surface of the clip supporting section, the base portion and the distal end portion having the same thickness as measured in a direction of the thickness of the clip supporting section.

8. The vehicle panel attachment arrangement according to claim 7, wherein
   the at least one resilient arm comprises a pair of resilient arms that are symmetrical to one another relative to the radial direction.

9. The vehicle panel attachment arrangement according to claim 8, wherein
   a first of the pair of resilient arms extends from the first side of the clip supporting section and a second of the pair of opposing resilient arms extends from the second side of the clip supporting section with a gap being defined between the respective distal end portions thereof.

10. The vehicle panel attachment arrangement according to claim 9, wherein
    the shaft insertion slot has a first width measured perpendicular to the radial direction, and the gap between the respective distal end portions of the first and second of the pair of resilient arms is greater than the first width.

11. The vehicle panel attachment arrangement according to claim 9, wherein
    the first and second of the pair of opposing resilient arms extend toward one another and are aligned with one another.

12. The vehicle panel attachment arrangement according to claim 7, wherein
    the resilient arm at least partially blocking an open end of the shaft insertion slot.

13. A vehicle panel attachment arrangement comprising
a vehicle panel;
a clip supporting section having a shaft receiving hole extending through the clip supporting section;
a first wall section extending from the vehicle panel to a first side of the clip supporting section;
a second wall section extending from the vehicle panel to a second side of the clip supporting section, with the clip supporting section further defining a shaft insertion slot open to the shaft receiving hole and extending in a radial direction from the shaft receiving hole between the first and second side walls; and
at least one resilient arm extending from one of the clip supporting section and the first wall section, the resilient arm including a base portion and a distal end portion having the same thickness as measured in a direction of the thickness of the clip supporting section, the distal end portion extending in a direction that is spaced apart from and parallel to the base portion with the resilient arm in a restricting orientation; and
a clip having a first washer portion and a second washer portion spaced apart from one another proximate one end of a shaft portion of the clip, the clip being movable from an insertion position to an installed position such that in the insertion position the shaft portion is located within the shaft insertion slot and the resilient arm is elastically deformed between the first and second washer portions, and in the installed position the shaft portion is located within the shaft receiving hole and the resilient arm is in the restricting orientation restricting movement of the clip from the installed position.

14. The vehicle panel attachment arrangement according to claim 13, wherein
the at least one resilient arm comprises a pair of resilient arms that are symmetrical to one another relative to the radial direction.

15. The vehicle panel attachment arrangement according to claim 14, wherein
a first of the pair of resilient arms extends from the first side of the clip supporting section and a second of the pair of opposing resilient arms extends from the second side of the clip supporting section such that the first and second of the pair of opposing resilient arms extend toward one another and are aligned with one another.

16. The vehicle panel attachment arrangement according to claim 14, wherein
a first of the pair of resilient arms and a second of the pair of opposing resilient arms define a gap between the respective distal end portions thereof.

17. The vehicle panel attachment arrangement according to claim 16, wherein
the gap between the respective distal end portions of the first and second of the pair of resilient arms is greater than a width of the shaft insertion slot with the clip in the installed position.

18. The vehicle panel attachment arrangement according to claim 16, wherein
the gap between the respective distal end portions of the first and second of the pair of resilient arms has a first width with the clip in the installed position, and
the gap has a second width smaller than the first width with the clip in the insertion position.

19. The vehicle panel attachment arrangement according to claim 13, wherein
the resilient arm at least partially blocks an open end of the shaft insertion slot.

20. The vehicle panel attachment arrangement according to claim 13, wherein
the clip includes a snap fitting structure at a second end of a shaft portion of the clip.

* * * * *